US008493495B2

(12) United States Patent
D'Souza et al.

(10) Patent No.: US 8,493,495 B2
(45) Date of Patent: Jul. 23, 2013

(54) MEDIA MODULE CONTROL

(75) Inventors: Stephen Richard D'Souza, Ottawa (CA); Robin Roy Glennie, Waterloo (CA)

(73) Assignee: Research In Motion Limited, Waterloo (CA)

(*) Notice: Subject to any disclaimer, the term of this patent is extended or adjusted under 35 U.S.C. 154(b) by 223 days.

(21) Appl. No.: 12/970,169

(22) Filed: Dec. 16, 2010

(65) Prior Publication Data

US 2012/0013784 A1 Jan. 19, 2012

Related U.S. Application Data

(60) Provisional application No. 61/365,116, filed on Jul. 16, 2010.

(51) Int. Cl.
*H04N 5/222* (2006.01)
(52) U.S. Cl.
USPC .............. 348/333.12; 348/208.6; 348/222.1
(58) Field of Classification Search
USPC ............ 348/222.1, 333.01–333.12, 347
See application file for complete search history.

(56) References Cited

U.S. PATENT DOCUMENTS

| | | | |
|---|---|---|---|
| 8,040,398 B2* | 10/2011 | Yoshida | 348/240.1 |
| 2002/0135601 A1 | 9/2002 | Watanabe | |
| 2005/0140813 A1* | 6/2005 | Wani | 348/333.12 |
| 2008/0025712 A1* | 1/2008 | Furuya | 396/88 |
| 2008/0204462 A1 | 8/2008 | Reed et al. | |
| 2009/0049408 A1 | 2/2009 | Naaman et al. | |
| 2009/0315842 A1 | 12/2009 | Peng | |
| 2010/0208122 A1* | 8/2010 | Yumiki | 348/333.08 |

FOREIGN PATENT DOCUMENTS

WO 2010080793 A2 7/2010

OTHER PUBLICATIONS

Snapture—New iPhone Camera App Adds Zoom, Burst Mode, Silent Mode, Most of What Apple Left Out. http://justanotheriphoneblog.com/wordpress/iphone-software/snapture-new-iphone-camera-app-adds-zoom-burst-mode-silent-mode-most-of-what-apple-left-out. Published on Apr. 6, 2008.
HTC Hero User Manual. support.sprint.com/global/pdf/user_guides/htc/hero/htc_hero_ug.pdf . Nov. 18, 2009.

(Continued)

*Primary Examiner* — Gevell Selby
(74) *Attorney, Agent, or Firm* — Novak Druce Connolly Bove + Quigg LLP (57) ABSTRACT

The technology includes processor-implemented methods, computer program products, and electronic devices for media module control. Media module zoom specifications are requested. Media module zoom specifications comprising zoom range are received. The received zoom range is divided into n discrete steps. A zoom bar is presented comprises an indicator of increasing zoom direction, an indicator of decreasing zoom direction, and a slider bar is presented. The slider bar is disposed substantially between the indicators. The slider bar displays zoom level as one of the n discrete steps from a first step equal to no zoom level, and an nth step equal to full zoom level. User input regarding a zoom level is received. Zoom is performed on the displayed image. The relative zoom level is displayed in the zoom bar.

21 Claims, 7 Drawing Sheets

OTHER PUBLICATIONS

HTC EVO 4G User Manual. support.sprint.com/global/pdf/user_guides/htc/evo/htc_evo_ug.pdf. May 3, 2010.

HTC Droid Incredible User Manual. http://cache.vzw.com/multimedia/mim/htc_incredible/incredible.pdf . 2010.

Apple iPhone 4G User Manual. http://manuals.info.apple.com/en_US/iPhone_iOS4_User_Guide.pdf. Jun. 6, 2010.

Extended European Search Report mailed Jul. 11, 2011. In corresponding application No. 10195462.6.

* cited by examiner

MEDIA MODULE CONTROL

CROSS REFERENCE TO RELATED APPLICATIONS

This application claims priority from U.S. Provisional Pat. App. Ser. No. 61/365,116, filed on Jul. 16, 2010, the contents of which are incorporated herein in their entirety for all purposes.

FIELD OF THE TECHNOLOGY

The technology disclosed herein (the "technology") relates to controlling zoom in a media module in a communication device.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

Figure 3:
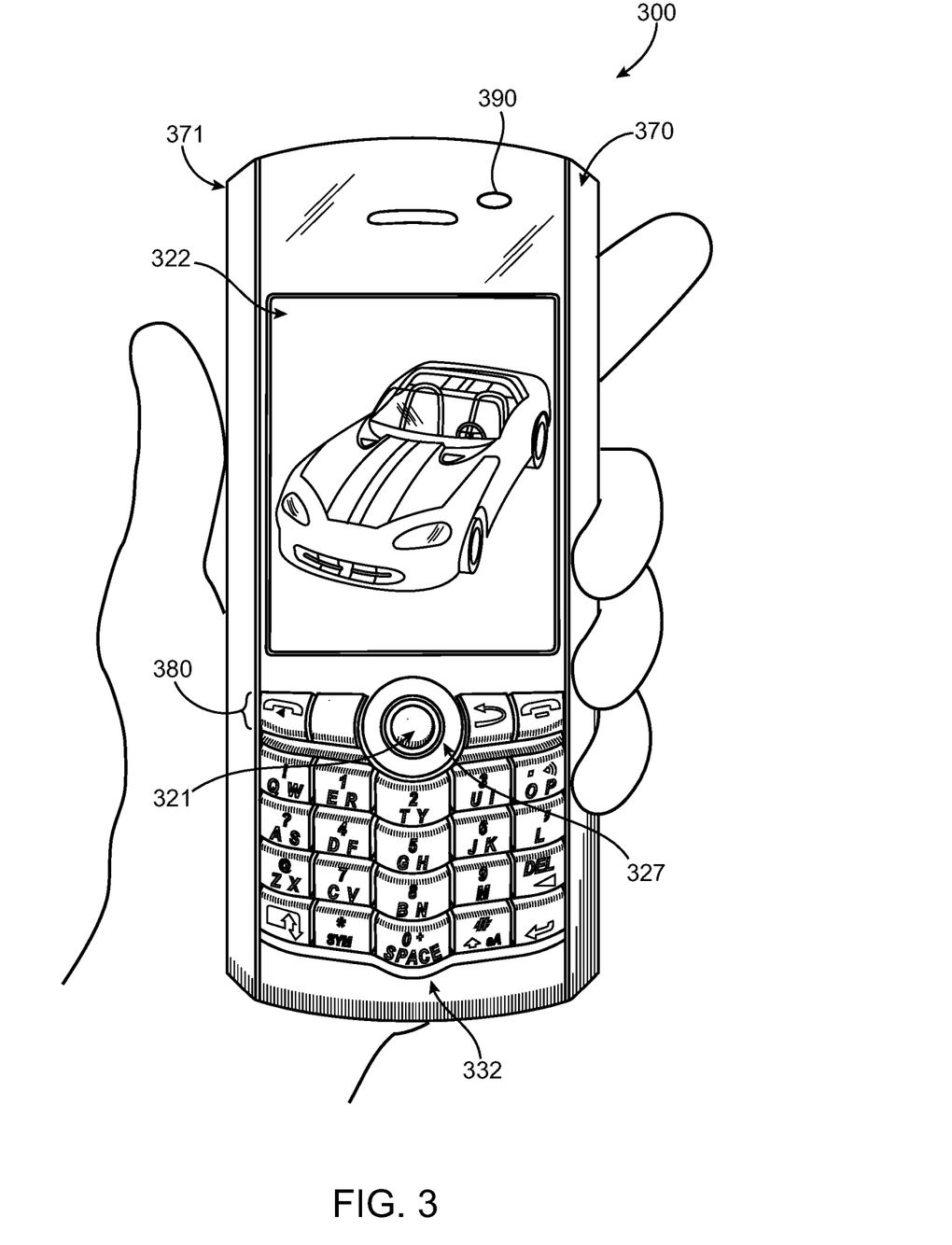
FIG. 3 illustrates a handheld communication device.

As may be appreciated from FIG. 3, an exemplary mobile communication device 300 (as an example of 103) comprises a display 322 located above a keyboard 332 constituting a user input means and suitable for accommodating textual input to the device 300. In some implementations, the keyboard 332 can be part of a touch screen display. The front face 370 of the device 300 has a navigation row 380. As shown, the device 300 is of uni-body construction, also known as a "candy-bar" design.

The device 300 may include an auxiliary input that acts as a cursor navigation tool 327 and that may be also exteriorly located upon the front face 370 of the device 300. Its front face location allows the tool to be thumb-actuable, e.g., like the keys of the keyboard 332. Some implementations provide the navigation tool 327 in the form of a trackball 321 that may be utilized to instruct two-dimensional screen cursor movement in substantially any direction, as well as act as an actuator when the trackball 321 is depressed like a button. Other implementations can provide the navigation tool in the form of a trackpad, a touch screen, a touchpad, a pointing stick, joystick, graphics tablet, or combinations thereof. The placement of the navigation tool 327 may be above the keyboard 332 and below the display screen 322; here, the navigation tool 327 may avoid interference during keyboarding and does not block the operator's view of the display screen 322 during use.

The device 300 may be configured to send and receive messages. The device 300 includes a body 371 that may, in some implementations, be configured to be held in one hand by an operator of the device 300 during text entry. A display 322 is included that is located on a front face 370 of the body 371 and upon which information is displayed to the operator, e.g., during text entry. The device 300 may also be configured to send and receive voice communications such as mobile telephone calls. The device 300 also can include a camera (not shown) to allow the device 300 to take electronic photographs that can be referred to as photos or pictures. Further, the device 300 can be configured to operate a web browser.

Figure 1:
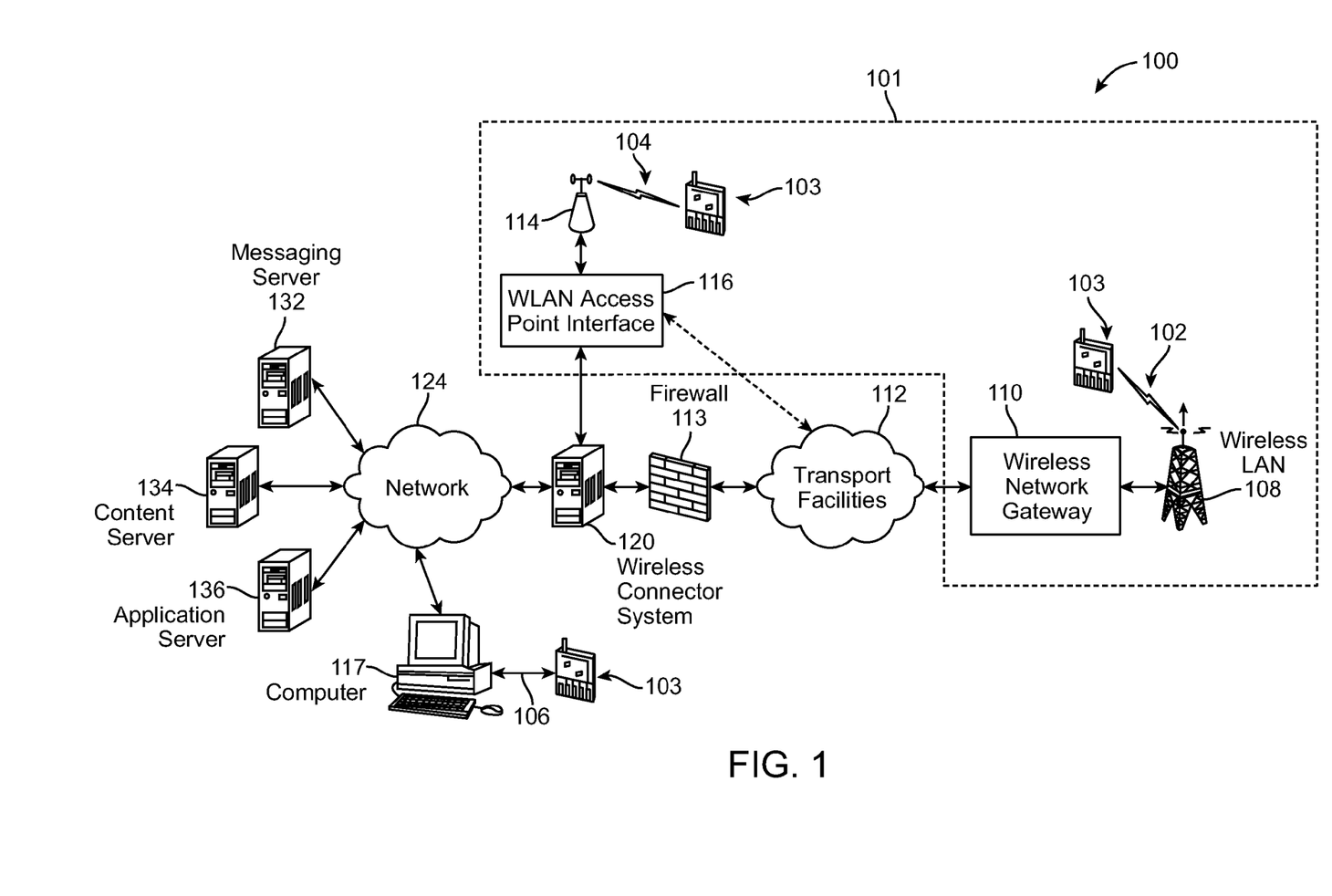
FIG. 1 illustrates a communication system including a mobile communication device to which example implementations of the technology can be applied.

In order to facilitate an understanding of environments in which example implementations described herein can operate reference is made to FIG. 1 that shows, in block diagram form, a communication system 100 in which implementations of the technology can be applied. The communication system 100 may comprise a number of mobile communication devices 103, e.g., 300, that may be connected to the remainder of system 100 in any of several different ways. Accordingly, several instances of mobile communication devices 103 are depicted in FIG. 1 employing different example ways of connecting to system 100.

These figures are exemplary only, and those persons skilled in the art will appreciate that some additional elements and modifications may be necessary to make the communication device, e.g., 103 operate in particular network environments. While in the illustrated implementations, the communication devices, e.g., 103 may comprise smart phones, in other implementations, however, the communication devices may comprise personal digital assistants (PDA), tablet computers, laptop computers, desktop computers, servers, or other communication devices capable of sending and receiving electronic messages.

Mobile communication devices 103 are connected to a wireless network 101 that may comprise one or more of a Wireless Wide Area Network (WWAN) 102 and a Wireless Local Area Network (WLAN) 104 or other suitable network arrangements. In some implementations, the mobile communication devices 103 are configured to communicate over both the WWAN 102 and WLAN 104, and to roam between these networks. In some implementations, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the mobile communication devices 103. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the mobile communication devices 103 to transport facilities 112, and through the transport facilities 112 to a wireless connector system 120. Transport facilities may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network (e.g., an intranet) and its resources, or the wireless connector system 120 may be operated by a mobile network provider. In some implementations, the network 124 may be realized using the Internet rather than or in addition to an internal or enterprise network.

The wireless network gateway 110 provides an interface between the wireless connector system 120 and the WWAN 102, which facilitates communication between the mobile communication devices 103 and other devices (not shown) connected, directly or indirectly, to the WWAN 102. Accordingly, communications sent via the mobile communication devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 103.

The WLAN 104 comprises a wireless network that, in some implementations, conforms to IEEE 802.11x standards (sometimes referred to as Wi-Fi™) such as, for example, the IEEE 802.11a, 802.11b and/or 802.11g standard. Other communication protocols may be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly (for example, if the access point 114 is part of an enterprise WLAN 104 in which the wireless connector system 120 resides), or indirectly as indicated by the dashed line in FIG. 1 via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that may connect to the wireless connector system 120.

The wireless connector system 120 allows the mobile communication devices 103 to access the network 124 and connected resources and services such as a messaging server 132 (for example, a Microsoft Exchange Server®, IBM Lotus Domino®, or Novell GroupWise™ email server), a content server 134 for providing content such as Internet content or content from an organization's internal servers, application servers 136 for implementing server-based applications such as instant messaging (IM) applications to mobile communication devices 103, and intranet file services.

The wireless connector system 120 typically provides a secure exchange of data (e.g., email messages, personal information manager (PIM) data, and IM data) with the mobile communication devices 103. In some implementations, communications between the wireless connector system 120 and the mobile communication devices 103 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some implementations, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination mobile communication device 103. The AP interfaces 116 of the WLAN 104 provide similar sending functions between the mobile communication device 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. A mobile communication device 103 may alternatively connect to the wireless connector system 120 using a computer 117, such as desktop or notebook computer, via the network 124. A link 106 may be provided for exchanging information between the mobile communication device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 103. Suitable variations of the communication system will be understood to a person of skill in the art and are intended to fall within the scope of the present disclosure.

Figure 4:
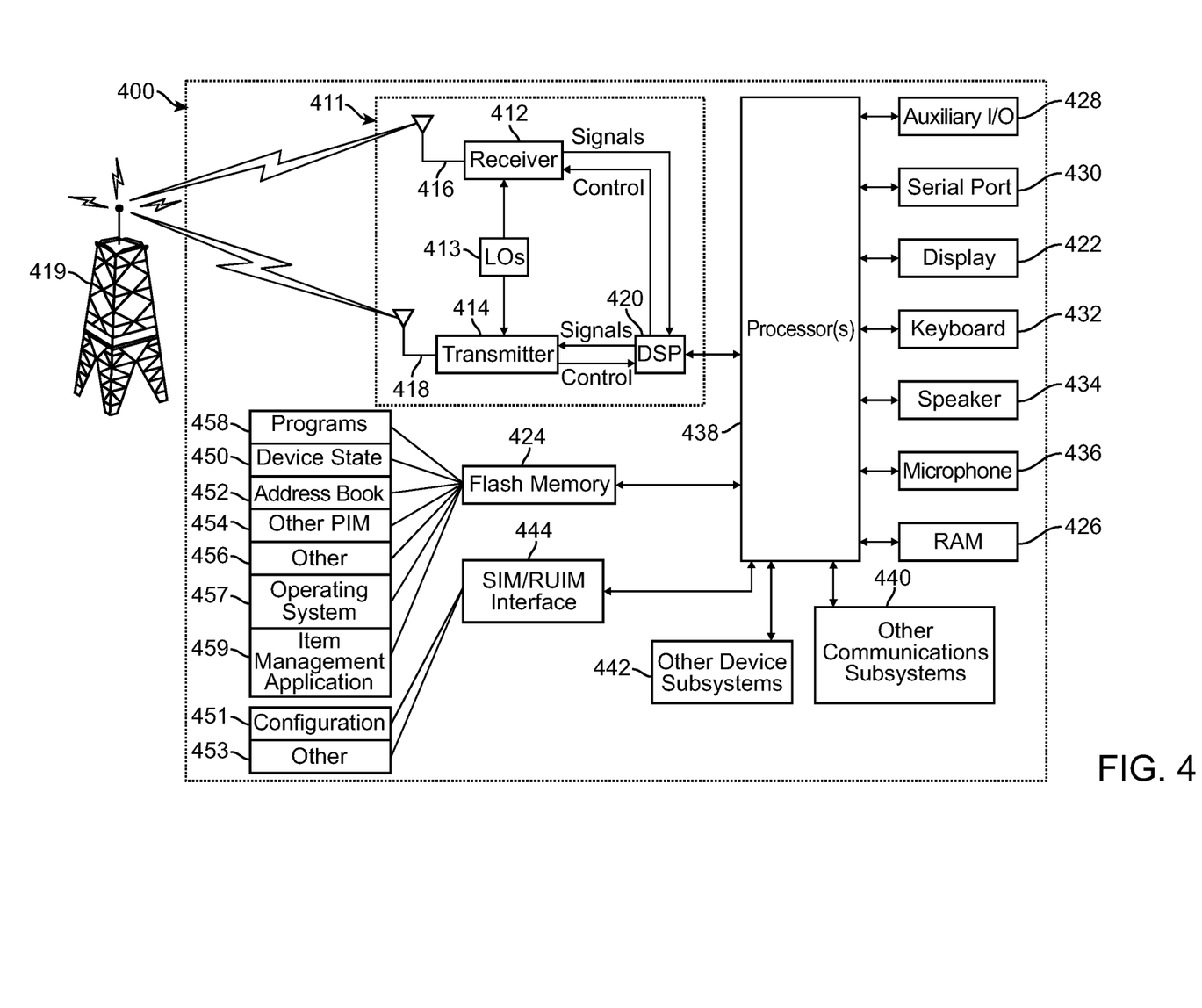
FIG. 4 illustrates a block diagram of a handheld communications device.

Referring to FIG. 4, a block diagram of a communication device, such as 300 and 103, in accordance with an exemplary implementation is illustrated. As shown, the device 400 includes a microprocessor 438 that controls the operation of the communication device 400. A communication subsystem 411 performs communication transmission and reception with the wireless network 419. The microprocessor 438 further can be communicatively coupled with an auxiliary input/output (I/O) subsystem 428 that can be communicatively coupled to the communication device 400. In at least one implementation, the microprocessor 438 can be communicatively coupled to a serial port (for example, a Universal Serial Bus port) 430 that can allow for communication with other devices or systems via the serial port 430. A display 422 (e.g., 322) can be communicatively coupled to microprocessor 438 to allow for displaying of information to an operator of the communication device 400. When the communication device 400 is equipped with a keyboard 432 (e.g., 332), the keyboard can also be communicatively coupled with the microprocessor 438. The communication device 400 can include a speaker 434, a microphone 436, random access memory (RAM) 426, and flash memory 424 all of which may be communicatively coupled to the microprocessor 438. Other similar components may be provided on the communication device 400 as well and optionally communicatively coupled to the microprocessor 438. Other communication subsystems 440 and other communication device subsystems 442 are generally indicated as being functionally connected with the microprocessor 438 as well. An example of a communication subsystem 440 is a short range communication system such as BLUETOOTH® communication module or a WI-FI® communication module (a communication module in compliance with IEEE 802.11b) and associated circuits and components. Additionally, the microprocessor 438 is able to perform operating system functions and enables execution of programs on the communication device 400. In some implementations not all of the above components may be included in the communication device 400. For example, in at least one implementation the keyboard 432 is not provided as a separate component and is instead integrated with a touch screen as described below.

The auxiliary I/O subsystem 428 can take the form of a variety of different navigation tools (multi-directional or single-directional) such as a trackball navigation tool 321 as illustrated in the exemplary implementation shown in FIG. 3, or a thumbwheel, a navigation pad, a joystick, touch-sensitive interface, or other I/O interface. These navigation tools may be located on the front surface of the communication device 400 or may be located on any exterior surface of the communication device 400. Other auxiliary I/O subsystems may include external display devices and externally connected keyboards (not shown). While the above examples have been provided in relation to the auxiliary I/O subsystem 428, other subsystems capable of providing input or receiving output from the communication device 400 are considered within the scope of this disclosure. Additionally, other keys may be placed along the side of the communication device 300 to function as escape keys, volume control keys, scrolling keys, power switches, or user programmable keys, and may likewise be programmed accordingly.

The keyboard 432 can include a plurality of keys that can be of a physical nature such as actuable buttons, or the buttons can be of a software nature, typically constituted by representations of physical keys on a display screen 422 (referred to herein as "virtual keys"). It is also contemplated that the user input can be provided as a combination of the two types of keys. Each key of the plurality of keys is associated with at least one action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 422, which in one implementation is enabled by touching the display screen 422, for example, with a stylus, finger, or other pointer, to generate the character or activate the indicated command or function. Some examples of display screens 422 capable of detecting a touch include resistive, capacitive, projected capacitive, infrared and surface acoustic wave (SAW) touch screens.

Physical and virtual keys can be combined in many different ways as appreciated by those skilled in the art. In one implementation, physical and virtual keys are combined such that the plurality of enabled keys for a particular program or feature of the communication device 400 is shown on the display screen 422 in the same configuration as the physical keys. Using this configuration, the operator can select the appropriate physical key corresponding to what is shown on the display screen 422. Thus, the desired character, command or function is obtained by depressing the physical key corresponding to the character, command or function displayed at a corresponding position on the display screen 422, rather than touching the display screen 422.

Furthermore, the communication device, e.g. 400 is equipped with components to enable operation of various programs, as shown in FIG. 4. In an exemplary implementation, the flash memory 424 is enabled to provide a storage location for the operating system 457, device programs 458, and data. The operating system 457 is generally configured to manage other programs 458 that are also stored in memory 424 and executable on the processor 438. The operating system 457 honors requests for services made by programs 458 through predefined program interfaces. More specifically, the operating system 457 typically determines the order in which multiple programs 458 are executed on the processor 438 and the execution time allotted for each program 458, manages the sharing of memory 424 among multiple programs 458, handles input and output to and from other device subsystems 442, and so on. In addition, operators can typically interact directly with the operating system 457 through a user interface usually including the keyboard 432 and display screen 422. While in an exemplary implementation the operating system 457 is stored in flash memory 424, the operating system 457 in other implementations is stored in read-only memory (ROM) or similar storage element (not shown). As those skilled in the art will appreciate, the operating system 457, device program 458 or parts thereof may be loaded in RAM 426 or other volatile memory.

In some implementations, the flash memory 424 may contain programs 458 for execution on the device 400, including—but not limited to—an address book 452, a personal information manager (PIM) 454, and a device state 450. Furthermore, programs 458 and other information 456 including data can be segregated upon storage in the flash memory 424 of the device 400.

When the communication device 400 is enabled for two-way communication within the wireless communication network 419, the device 400 can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 400 may use a unique identifier to enable the communication device 400 to transmit and receive signals from the communication network 419. Other systems may not use such identifying information. GPRS, UMTS, and EDGE use a Subscriber Identity Module (SIM) in order to allow communication with the communication network 419. Likewise, most CDMA systems use a Removable User Identity Module (RUIM) in order to communicate with the CDMA network. The RUIM and SIM card can be used in multiple different communication devices 400. The communication device 400 may be able to operate some features without a SIM/RUIM card, but the device 400 will not be able to communicate with the network 419. A SIM/RUIM interface 444 located within the communication device 400 allows for removal or insertion of a SIM/RUIM card (not shown). The SIM/RUIM card features memory and holds key configurations 451, and other information 453 such as identification and subscriber related information. With a properly enabled communication device 400, two-way communication between the communication device 400 and communication network 419 is possible.

If the communication device 400 is enabled as described above or the communication network 419 does not use such enablement, the two-way communication enabled communication device 400 is able to both transmit and receive information from the communication network 419. The transfer of communication can be from the communication device 400 or to the communication device 400. In order to communicate with the communication network 419, the device 400 can be equipped with an integral or internal antenna 418 for transmitting signals to the communication network 419. Likewise the device 400 can be equipped with another antenna 416 for receiving communication from the communication network 419. These antennae (416, 418) in another exemplary implementation are combined into a single antenna (not shown). As one skilled in the art would appreciate, the antenna or antennae (416, 418) in another implementation can be externally mounted on the communication device 400.

When equipped for two-way communication, the communication device 400 features a communication subsystem 411. As is understood in the art, this communication subsystem 411 is modified so that the communication system 411 can support the operational needs of the communication device 400. The subsystem 411 includes a transmitter 414 and receiver 412 including the associated antenna or antennae (416, 418) as described above, local oscillators (LOs) 413, and a processing module that in the presently described exemplary implementation is a digital signal processor (DSP) 420.

It is contemplated that communication by the communication device 400 with the wireless network 419 can be any type of communication that both the wireless network 419 and communication device 400 are enabled to transmit, receive and process. In general, these can be classified as voice and data. Voice communication generally refers to communication in which signals for audible sounds are transmitted by the communication device 400 through the communication network 419. Data generally refers to all other types of communication that the communication device 400 is capable of performing within the constraints of the wireless network 419.

Example device programs that can depend on such data include email, contacts and calendars. For each such program, synchronization with home-based versions of the program can be desirable for either or both of their long term and short term utility. As an example, emails are often time-sensitive, so substantially real time (or near-real time) synchronization may be desired. Contacts, on the other hand, can be usually updated less frequently without inconvenience. Therefore, the utility of the communication device 400 is enhanced when connectable within a communication system, and when connectable on a wireless basis in a network 419 in which voice, text messaging, and other data transfer are accommodated. Device 400 can include programs such as a web browser, a file browser, and client programs for interacting with server programs. Devices, e.g., 103, 300, 400, for use in the technology can be characterized by an identification number assigned to the device. Such identification numbers cannot be changed and are locked to each device.

Multimedia-enabled smart phones, e.g., 300, can incorporate modules, e.g., other device subsystems 442, for various media applications, e.g., still camera, video camera, attachment viewer. The particular module, and the performance of that module, for a given application can vary across smart phone models. For example, smart phone camera modules that perform digital zoom at 2×, 3×, and even 6× are known.

Digital zoom is a method of decreasing (narrowing) the apparent angle of view of a digital photographic or video image. Typically, digital zoom is performed by cropping an image to a centered area with the same aspect ratio as the original image, and optionally interpolating the result back to the pixel dimensions of the original image. Digital zoom is accomplished electronically, without adjustment of the camera's optics. No optical resolution is gained in the process. However, on devices such as smart phones, digital zoom is useful.

Implementations of the present technology include devices, e.g., 103, 300, 400, computer program products, and computer implemented methods for integration of the zoom function of various media modules having differing zoom performance using a single framework. Media modules include still cameras and video cameras. Zoom can include both digital and optical zoom. Implementations of the present technology offer particular utility with respect to digital zoom.

The program code for the technology can be written in Java. Java is normally compiled to byte-code which the Java virtual machine (JVM) then either interprets or "just-in-time" compiles to machine code, and then executes. The Java program code can be common across devices, stored among programs 458, and loaded into flash memory 424 for execution by processor(s) 438. The camera module is known to the operating system 457. The operating system 457, typically written in a language such as C++, is typically device-specific.

Figure 2:
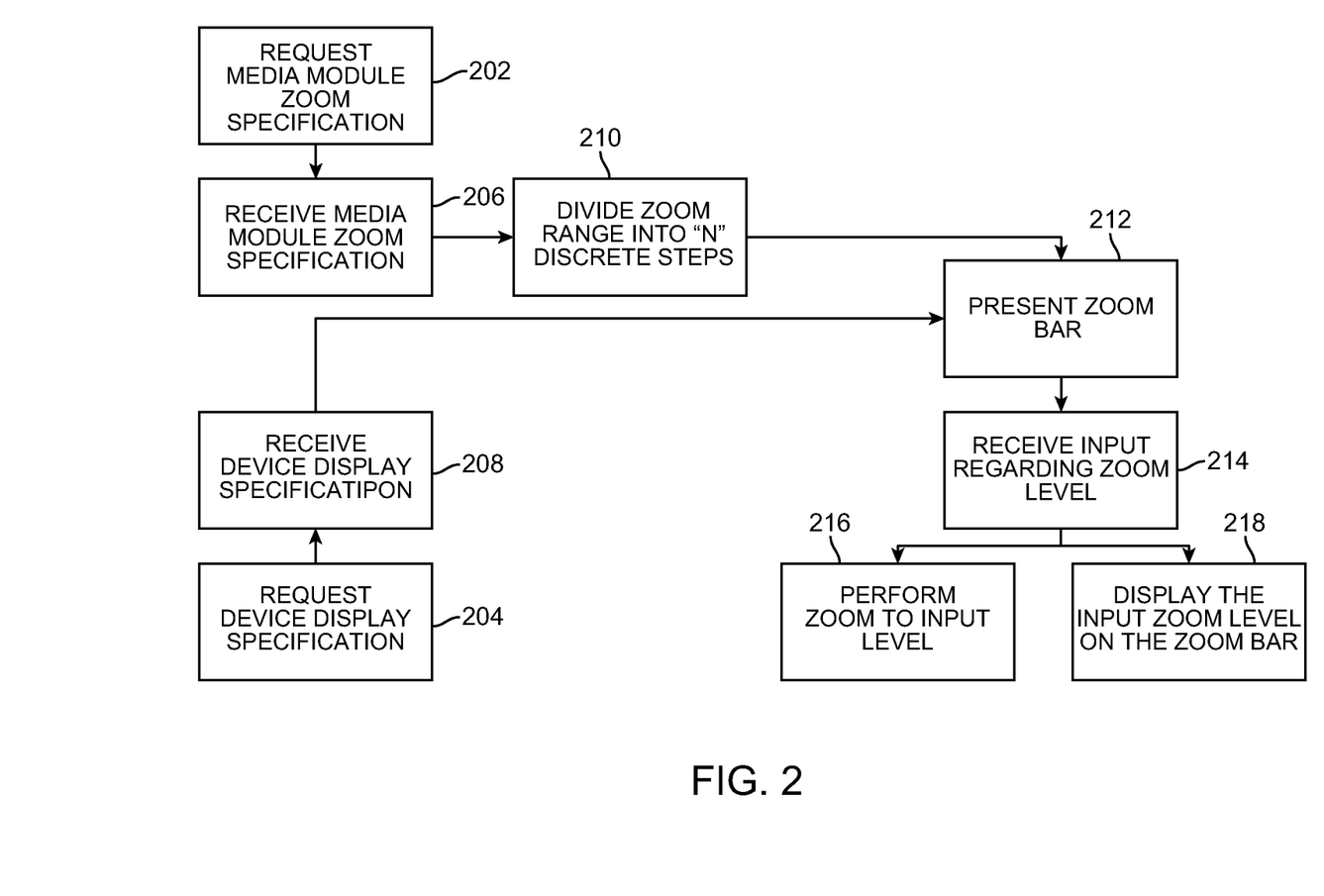
FIG. 2 illustrates methods of the technology

Referring to FIG. 2, the technology can request media module zoom specifications 202, e.g., zoom range, via the operating system 457. The technology also can request display specifications 204, e.g., size, orientation, via the operating system 457. Upon receiving the zoom range 206 the technology can divide the zoom range in to n discrete steps 210. The number of discrete steps can be set in the program code, or can be adjustable. In some implementations, n is set by program code to five (5).

Figure 5:
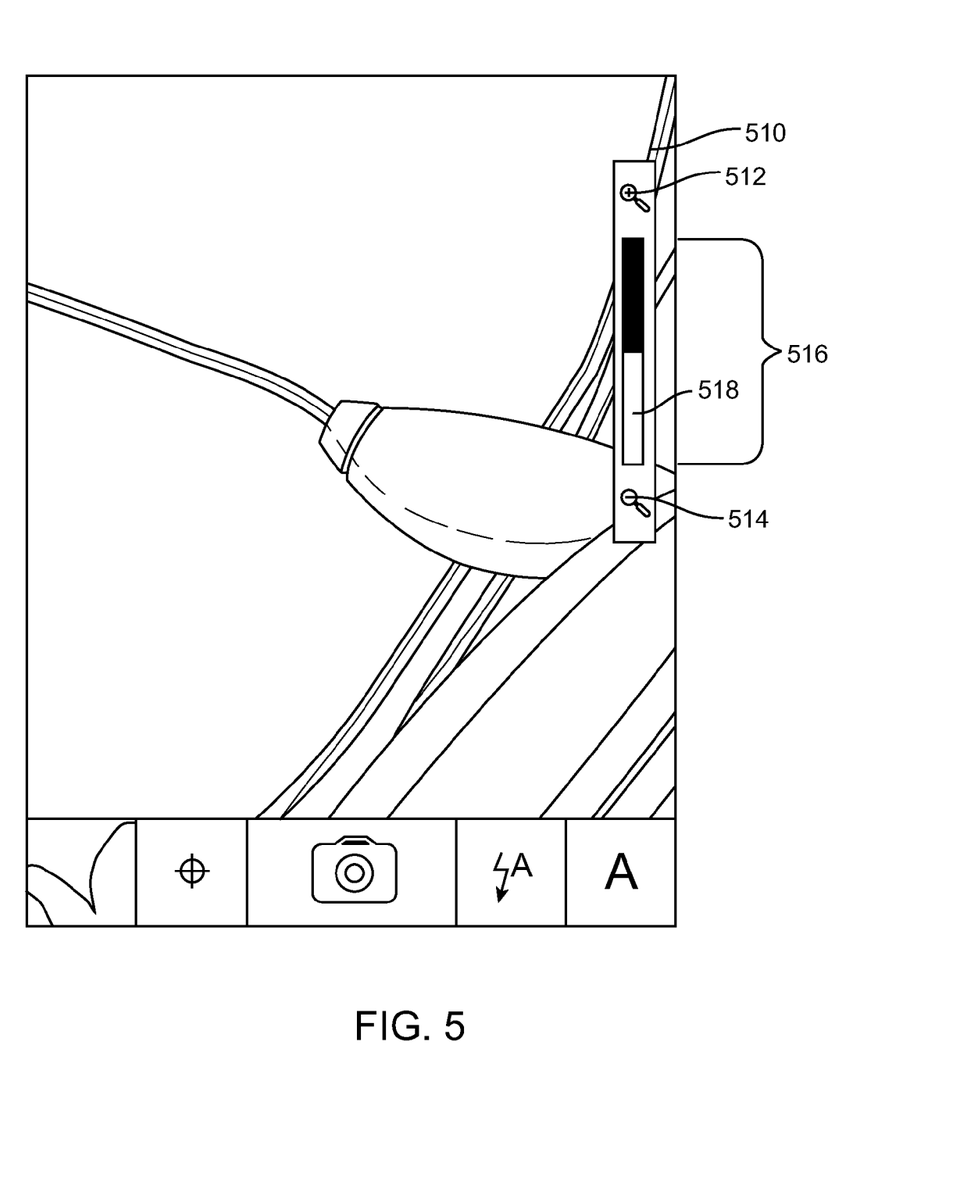
FIG. 5 illustrates a zoom bar of the technology in a portrait device display.
Figure 6:
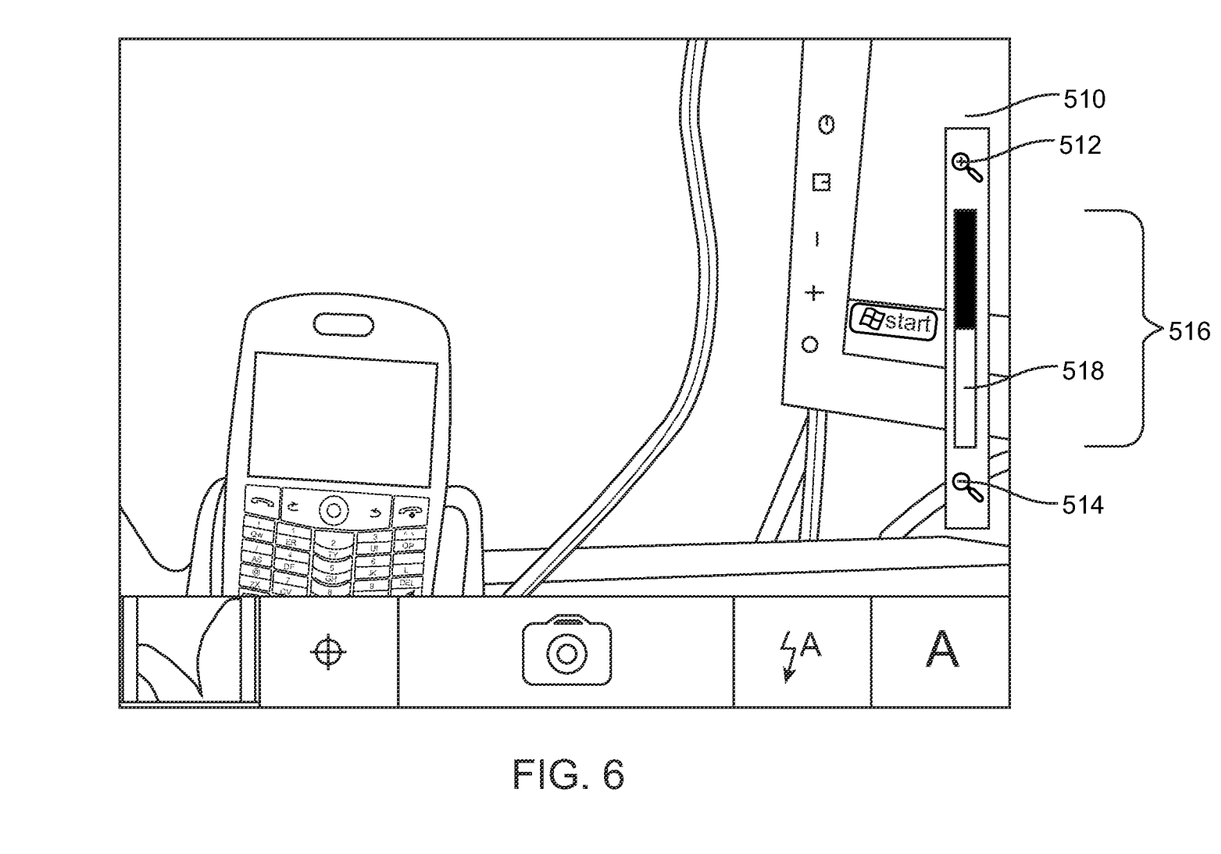
FIG. 6 illustrates a zoom bar of the technology in a landscape device display.
Figure 7:
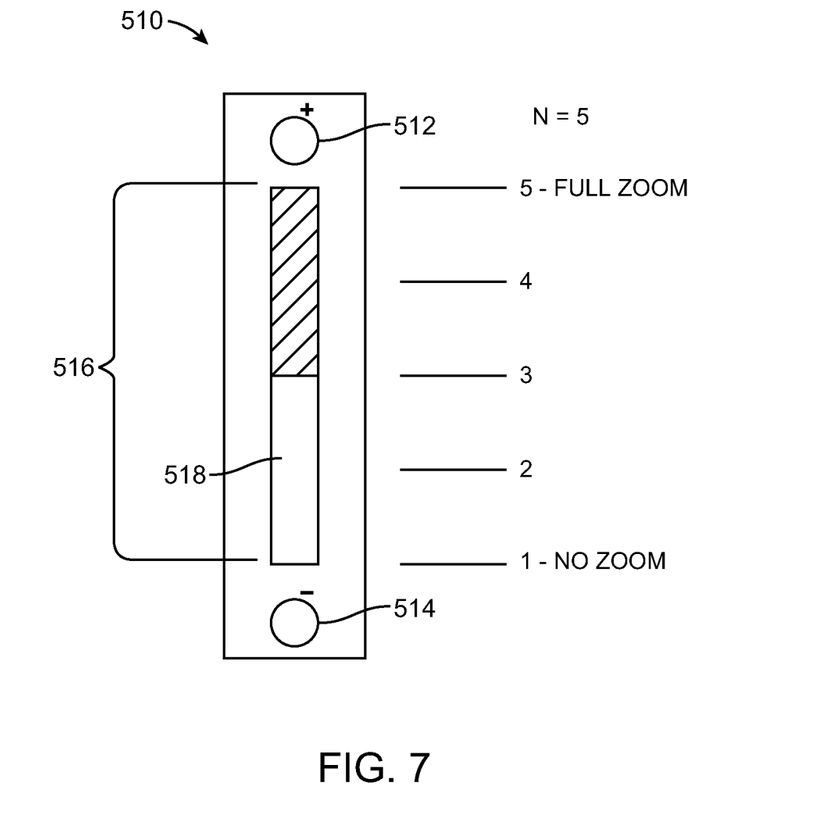
FIG. 7 illustrates a zoom bar of the technology

Continuing to refer to FIG. 2, and also referring to FIG. 5 (display 422 in portrait orientation) and FIG. 6 (display 422 in landscape orientation), after receiving device display specification 208 and receiving media module zoom specification 206, the technology can present 212 a zoom bar 510, shown in FIG. 5 and FIG. 6 as a vertically oriented zoom bar 510 on the right side of the device display 422 selectable by a user to each of the n steps, without displaying the numerical value of the zoom. Zoom bar 510 includes an indicator of increasing zoom direction 512, an indicator of decreasing zoom direction 514, and a slider bar 516 disposed substantially therebetween. The slider bar illustrated in FIG. 5 and FIG. 6 shows relative zoom level 518 as white, and in FIG. 7 as uncross-hatched. Referring to FIG. 7, the levels of an n=5 slider bar 516 are shown. Level 1 is "no zoom." Level 5 is "full zoom." While a zoom bar has been disclosed, the zoom indicator of the technology can take other forms, e.g., a zoom circle with zoom level indicated by angle portions, a zoom circle with zoom level indicated by concentric geometric objects (e.g., circles).

The technology receives user input regarding a zoom level 214 and then performs zoom on the displayed image 216 and displays the relative zoom level in the zoom bar 218. User input regarding zoom level can be accepted through various means, including "pinching" on a touch screen (i.e., placing two fingers on the screen and spreading the fingers farther apart or bringing the fingers closer together), use of "+" and "−" keys of keyboard 423 to increase and decrease the zoom level respectively, touching a touch screen nearer to the desired zoom level than to other zoom levels, and other actions appropriate to the nature of the device.

In some implementations, the technology continues to display the zoom bar 510 for a predetermined period of time. In some implementations, the technology continues to display the zoom bar 510 while the device selection means remains selecting the zoom bar 510. In some implementations, the technology terminates the zoom bar display upon selecting Level 1 "no zoom." In some implementations, zoom can be enabled and disabled by user action received by the device. If zoom is disabled, the zoom bar 510 does not appear for zoom. Note that optical zoom can be independent of zoom.

In this fashion, program code written in a platform independent language, can be used to query, via the device OS, for media module specifications and display specifications to present a uniform graphical zoom control offering n discrete zoom steps via the device display, accept user input regarding zoom level, and display the selected zoom level.

In summary, the technology includes processor resources-implemented methods, computer program products, and systems for controlling zoom in a media module in an electronic device. In various implementations the technology can request media module zoom specifications. Media module zoom specifications comprising zoom range are received. The received zoom range can be divided in to n discrete steps. A zoom bar can be presented on the device display. The zoom bar can include an indicator of increasing zoom direction, an indicator of decreasing zoom direction, and a slider bar. The slider bar can be disposed substantially between the indicators. The slider bar can display zoom level as one of the n discrete steps from a first step equal to no zoom level, and an nth step equal to full zoom level. User input regarding a zoom level can be received. Zoom to the received zoom level can be performed on the displayed image. The relative zoom level can be displayed in the zoom bar.

In some implementations the zoom bar can occupy a space substantially along the margin of an edge of the display. In some implementations the zoom bar size in the dimension along a line connecting the indicators can be substantially greater than the zoom bar size perpendicular to the line connecting the indicators. In some implementations, prior to presenting a zoom bar on the device display, device display specifications can be requested, and device display specifications comprising display size and display orientation can be received, and the zoom bar size in the dimension along the line connecting the indicators can be greater than one half of the display size in the dimension parallel to the line connecting the indicators. In some implementations n can be one of: fixed and selectable. In some implementations the media module can be one of a still camera module and a video camera module. In some implementations the zoom bar can be terminated from the display upon at least one of: selection of the lowest of the n levels, expiration of a predetermined period of time, termination of selection of the zoom bar by the device selection means.

The technology can take the form of hardware, software or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electro-magnetic, infrared, or semiconductor system or apparatus or device, or transitory (e.g., a signal). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor resource coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A processor resources-implemented method for controlling a zoom feature in a media module in a communication device, the method comprising:
   requesting media module zoom specifications;
   receiving media module zoom specifications comprising zoom range in response to the request;
   dividing the received zoom range into n discrete steps, where n is a positive integer;
   rendering a zoom bar on the display of a device, wherein the zoom bar comprises:
      an indicator of increasing zoom direction,
      an indicator of decreasing zoom direction, and
      a slider bar:
         the slider bar disposed substantially between the indicators, and
         the slider bar displaying zoom level as one of the n discrete steps from a first step equal to no zoom level, and an nth step equal to full zoom level;
   receiving user input regarding a zoom level;
   performing zoom on the displayed image to a level corresponding to the received input; and
   displaying the relative zoom level in the zoom bar.

2. The processor resources-implemented method of claim 1:
   wherein the zoom bar occupies a space substantially along the margin of an edge of the display.

3. The processor resources-implemented method of claim 2:
   wherein the zoom bar size in the dimension along a line connecting the indicators is substantially greater than the zoom bar size perpendicular to the line connecting the indicators.

4. The processor resources-implemented method of claim 3:
   further comprising, prior to rendering a zoom bar on the device display:
      requesting device display specifications, and
      receiving device display specifications comprising display size and display orientation; and
   wherein the zoom bar size in the dimension along the line connecting the indicators is greater than one half of the display size in the dimension parallel to the line connecting the indicators.

5. The processor resources-implemented method of claim 1 wherein n is one of: fixed and selectable.

6. The processor resources-implemented method of claim 1 wherein the media module is one of a still camera module and a video camera module.

7. The processor resources-implemented method of claim 1 further comprising terminating the zoom bar from the display upon at least one of: selection of the lowest of the n levels, expiration of a predetermined period of time, termination of selection of the zoom bar by the device selection means.

8. A computer program product for controlling a zoom feature in a media module in a communication device, the computer program product comprising:
   at least one non-transitory computer readable medium; and
   at least one program module, operable upon execution by processor resources to:
      request media module zoom specifications;
      receive media module zoom specifications comprising zoom range in response to the request;
      divide the received zoom range into n discrete steps, where n is a positive integer;
      present a zoom bar on the device display, wherein the zoom bar comprises:
         an indicator of increasing zoom direction,
         an indicator of decreasing zoom direction, and
         a slider bar:
            the slider bar disposed substantially between the indicators, and
            the slider bar displaying zoom level as one of the n discrete steps from a first step equal to no zoom level, and an nth step equal to full zoom level;
      receive user input regarding a zoom level;
      perform zoom on the displayed image to a level corresponding to the received input; and
      display the relative zoom level in the zoom bar.

9. The computer program product of claim 8:
   wherein the zoom bar occupies a space substantially along the margin of an edge of the display.

10. The computer program product of claim 9:
    wherein the zoom bar size in the dimension along a line connecting the indicators is substantially greater than the zoom bar size perpendicular to the line connecting the indicators.

11. The computer program product of claim 10:
    further comprising, prior to rendering a zoom bar on the device display:
       request device display specifications, and
       receive device display specifications comprising display size and display orientation; and
    wherein the zoom bar size in the dimension along the line connecting the indicators is greater than one half of the display size in the dimension parallel to the line connecting the indicators.

12. The computer program product of claim 8 wherein n is one of: fixed and selectable.

13. The computer program product of claim 8 wherein the media module is one of a still camera module and a video camera module.

14. The computer program product of claim 8 further comprising terminating the zoom bar from the display upon at least one of: selection of the lowest of the n levels, expiration of a predetermined period of time, termination of selection of the zoom bar by the device selection means.

15. A mobile communication device comprising:
at least one processor resource,
at least one non-transitory computer readable medium in communication with the processor resource; and
at least one program module,
  stored on the at least one medium, and
  operable, upon execution by the processor to:
  at least one computer readable medium; and
  at least one program module, operable upon execution by processor resources to:
    request media module zoom specifications;
    receive, in response to the request, media module zoom specifications comprising zoom range;
    divide the received zoom range into n discrete steps, where n is a positive integer;
    present a zoom bar on the device display, wherein the zoom bar comprises:
      an indicator of increasing zoom direction,
      an indicator of decreasing zoom direction, and
      a slider bar:
        the slider bar disposed substantially between the indicators, and
        the slider bar displaying zoom level as one of the n discrete steps from a first step equal to no zoom level, and an nth step equal to full zoom level;
    receive user input regarding a zoom level;
    perform zoom on the displayed image to a level corresponding to the received input; and
    display the relative zoom level in the zoom bar.

16. The mobile communication device of claim 15:
wherein the zoom bar occupies a space substantially along the margin of an edge of the display.

17. The mobile communication device of claim 16:
wherein the zoom bar size in the dimension along a line connecting the indicators is substantially greater than the zoom bar size perpendicular to the line connecting the indicators.

18. The mobile communication device of claim 17:
further comprising, prior to rendering a zoom bar on the device display:
  request device display specifications, and
  receive device display specifications comprising display size and display orientation; and
wherein the zoom bar size in the dimension along the line connecting the indicators is greater than one half of the display size in the dimension parallel to the line connecting the indicators.

19. The mobile communication device of claim 15 wherein n is one of: fixed and selectable.

20. The mobile communication device of claim 15 wherein the media module is one of a still camera module and a video camera module.

21. The mobile communication device of claim 15 further comprising terminating the zoom bar from the display upon at least one of: selection of the lowest of the n levels, expiration of a predetermined period of time, termination of selection of the zoom bar by the device selection means.

* * * * *